United States Patent [19]

Ardito

[11] 4,347,637
[45] Sep. 7, 1982

[54] MANUFACTURING PROCESS OF SANDALS AND CLOGS WITH PLASTIC SOLES AND SHOES MANUFACTURED THROUGH THIS PROCESS

[75] Inventor: Francesco Ardito, Barletta, Italy

[73] Assignee: Calzaturificio "Plastica Excelsior" di Francesco Ardito, Barletta, Italy

[21] Appl. No.: 148,495

[22] Filed: May 9, 1980

[30] Foreign Application Priority Data

May 11, 1979 [IT] Italy ............................. 2119 A/79

[51] Int. Cl.$^3$ ........................... A43D 9/00; A43B 3/12
[52] U.S. Cl. .................................... 12/142 S; 36/11.5
[58] Field of Search .......... 12/142 R, 142 S, 142 RS, 12/142 T; 36/11.5, 14

[56] References Cited

U.S. PATENT DOCUMENTS 2,744,340 5/1956 Gerber ............................ 12/142 S
4,333,247 6/1982 Marinelli ......................... 12/142 S Primary Examiner—Patrick D. Lawson
Attorney, Agent, or Firm—Holman & Stern

[57] ABSTRACT

The process to manufacture sandals bases on the use of a mold made up by two parts: the first, the lower, containing the upside-down print of that part of the sole which has to be contacted by the foot; the second, that is the cover, containing the upside-down print of that part of the sole which will touch the soil. The upper of the shoe, made up by two straps, have to be inserted, separately, before the molding, in the flutings located on the edges of the lower part of the mold, while the surface which is to form the external part of the upper itself faces upward. At their ends inserted in the mold, these straps are equipped with holes which, during the molding fill with the mix such as polyurethan, or poly vinyl chloride used for the manufacturing of the soles and after its solidification, give a high tear-resistent linkage between each strap itself and the sole.

4 Claims, 7 Drawing Figures

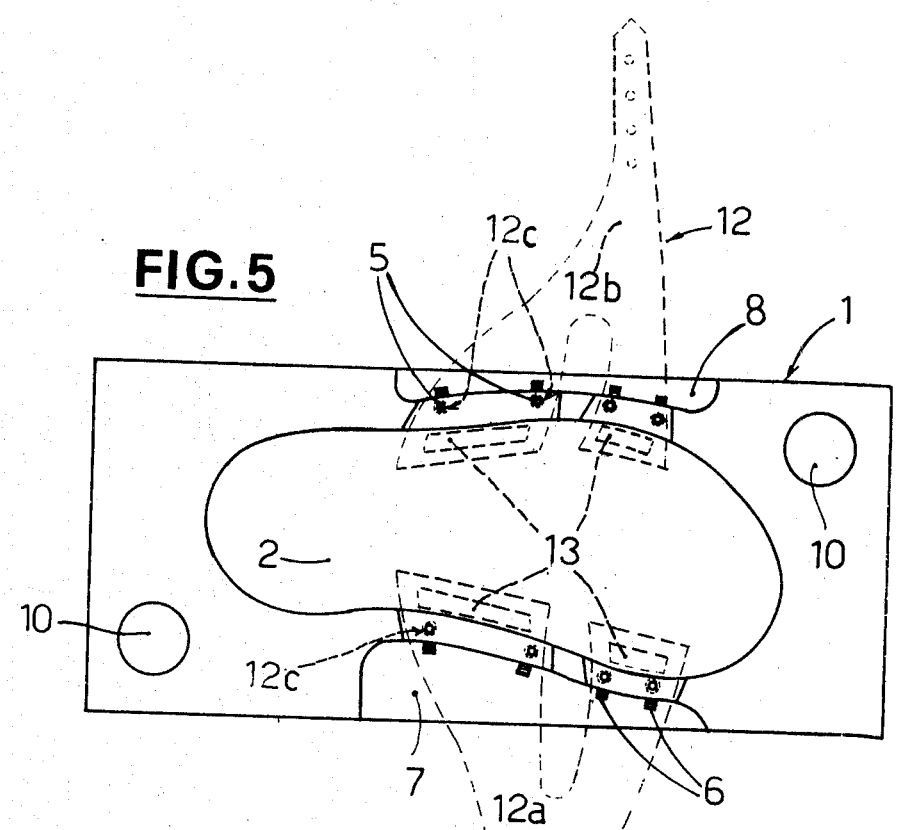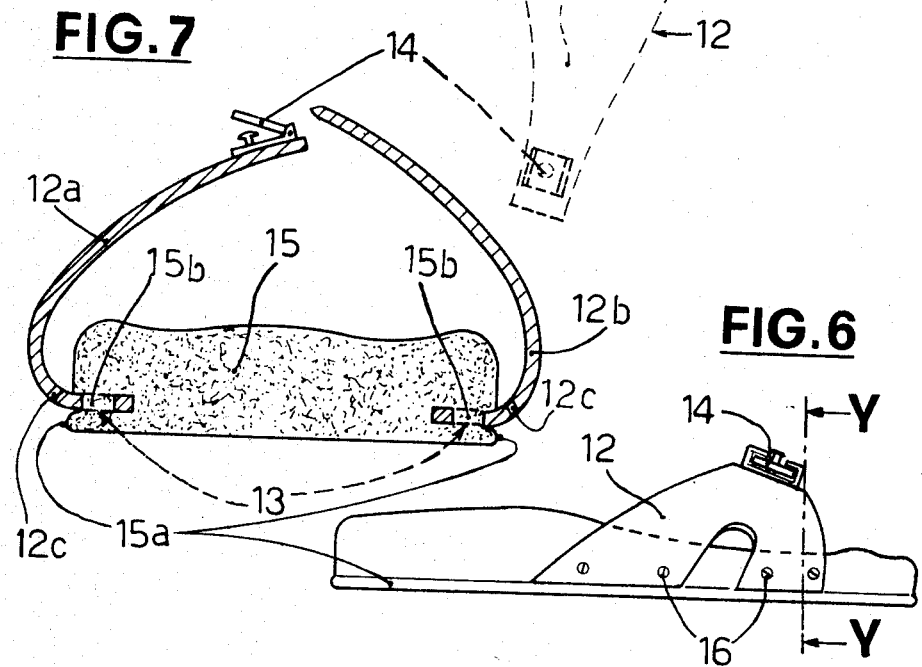

MANUFACTURING PROCESS OF SANDALS AND CLOGS WITH PLASTIC SOLES AND SHOES MANUFACTURED THROUGH THIS PROCESS

BACKGROUND OF THE INVENTION

The invention refers to a new manufacturing process of sandals, clogs and other similar shoes with plastic soles; the ends of two leather or plastic straps linked together by a buckle to form the upper, are included in the plastic sole so as to be linked together.

A first manufacturing process of sandals and clogs with plastic soles requires the sewing of the straps forming the upper to an inner sole that after being mounted on a shoe last is brought with its inferior surface into contact with the mix, in a liquid state, contained in the mold of the sole to cause mutual sticking.

According to another manufacturing process of clogs with plastic soles, after having manufactured the sole, the upper is connected with nails and other similar devices to the lateral face of the plastic sole itself.

With another manufacturing process, the leather or plastic straps forming the upper are sandwiched between the sole and the inferior face of an inner sole and are glued together.

Recently, according to another manufacturing process of sandals and clogs with plastic soles, the plastic sole itself is furnished with a cross hole of rectangular section, which passes through the sole from one side to the other; an end of the leather or plastic strap is introduced in the hole and after having passed through the hole itself, is connected to the other end to form the upper.

None of the above-mentioned processes give long wear or good appearance to sandals or clogs because of the difficulties in connecting the straps forming the upper to the plastic sole, nor low-price shoes because or the time required in the manufacturing and the high incidence of labor.

Furthermore, the sandals made according to the last of the above-mentioned processes ruin the feet because of the movement of the straps through the cross hole in the sole while walking.

OBJECTS OF THE INVENTION

The invention as claimed, is to provide a remedy to the above-mentioned faults. It solves the problem of how to realize a steady, high wear resistance and extremely durable connection between the straps forming the upper and the plastic sole without using glues, nails, stitchings and other similar means of linkage, in which the tension transmitted to the straps by the feet is uniformly absorbed by the straps and by the sole together. It is so possible both to avoid the presence of tearings in those places which are most stretched, which might occur where nails and stitchings are usually put, and to have long wear and safe shoes.

Furthermore, it solves the problem of how to eliminate all the necessary work to connect the straps forming the upper to the sole, after the molding of the sole itself.

The advantage of this process is mainly to make it possible to obtain long wear sandals and clogs with low manufacturing costs.

Other advantages are that the shoes allow safe walking, do not ruin the feet by the movement of the straps forming the upper and are nice.

SUMMARY OF THE INVENTION

The invention is a process to manufacture footwear having plastic soles. The first step is to provide at least two straps, each having attaching means on one end and some first holes inboard of and adjacent to the edge of the opposite end. A mold to produce the sole is provided having a first sole mold portion having flutings along the side edges and a plurality of vertical stakes projecting upwardly inboard of the side edges of the sole, in which are inserted some second smaller holes in the edge portions of the straps, adjacent to the first above-mentioned holes.

A second mold portion is provided having receiving holes for the vertical stakes of the first mold section and placed over the straps and the first sole mold portion. The sole is then formed by pouring a polymeric material in the open space of the mold so as to fill the first holes of the strap.

DESCRIPTION OF THE DRAWINGS

The process is described below, in details, with reference to the drawings which illustrate only one specified embodiment of the steps necessary to carry out the process itself:

FIG. 5 is the lower part of the mold with the straps in the position in which they must be inserted before molding;

FIG. 6 is a sandal manufactured according to the process of the invention; and

FIG. 7 is a sectional view of the sandal of FIG. 6 taken through section lines Y—Y.

DETAILED DESCRIPTION OF THE INVENTION

Figure 1:
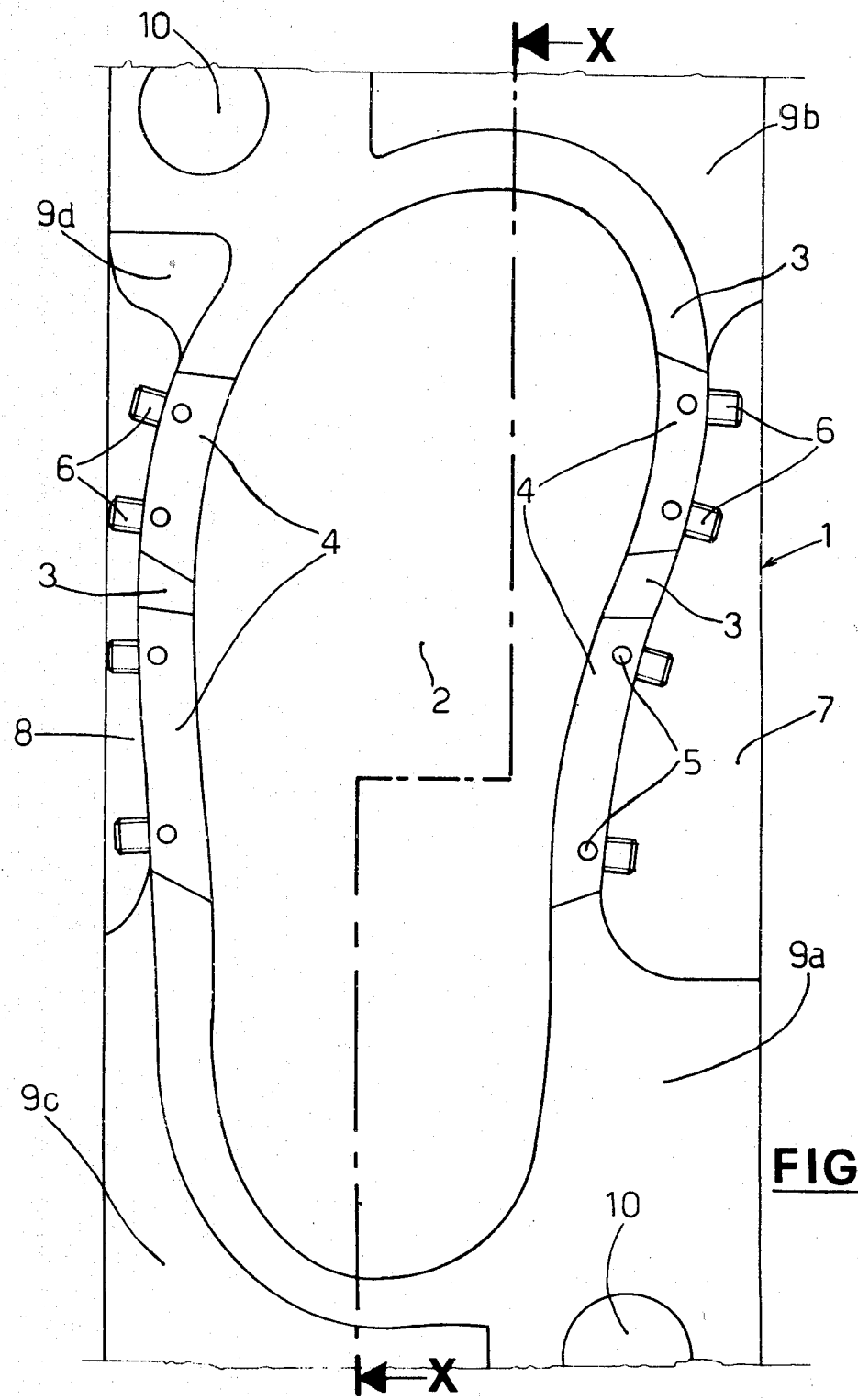
FIG. 1 is an upper view of the lower part of the mold according to the invention.
Figure 2:
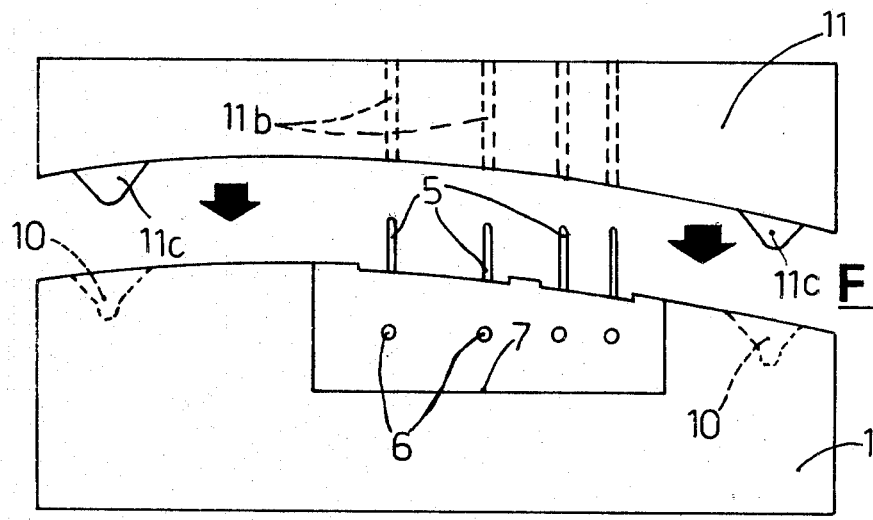
FIG. 2 is a side view of the lower and upper parts of the mold in an open position.
Figure 3:
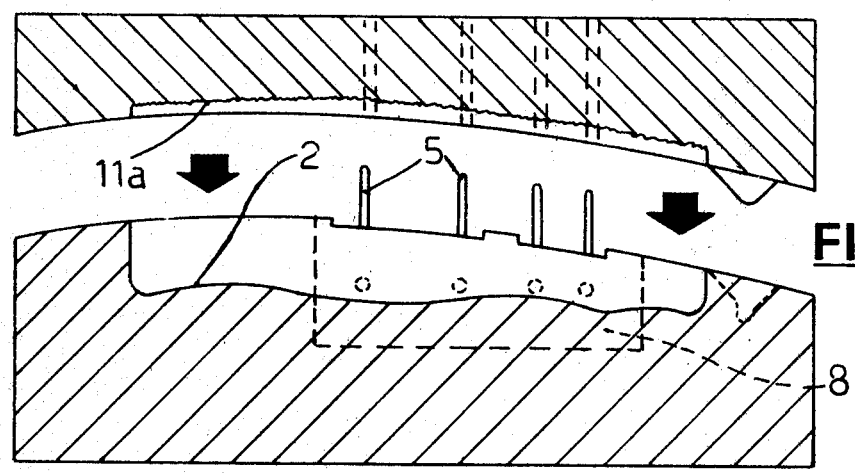
FIG. 3 is a side cross-sectional view of the mold parts.
Figure 4:
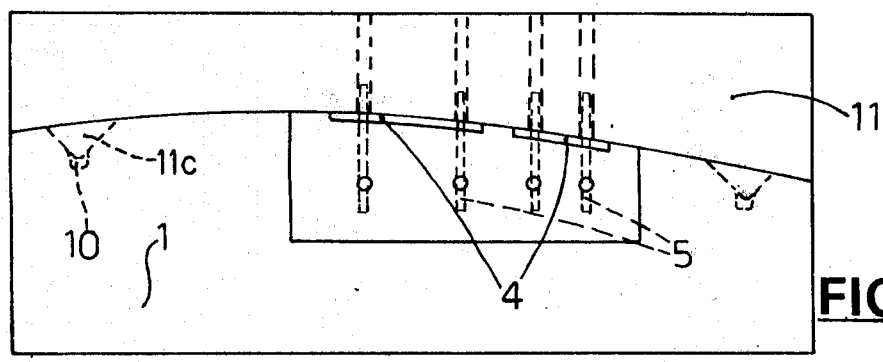
FIG. 4 is a side view of the mold in its closed position.

The process is realized by means of a closed mold in which the suitable plastic materials, such as polyurethan or polyvinyl chloride, hereafter PVC, is poured when it is still fluid, and it expands itself without the application of pressure to fill the whole inner volume of the mold itself.

The mold is formed by two parts: a lower part 1 and an upper part 11, acting as a cover, in suitable materials. In the lower part 1 there is the upside-down print 2 of the surface of the sole on which the foot has to lay, in the upper part 11 of the mold there is the upside-down sole surface print which will touch the soil.

The print in base 1 is delimited by an edge 3 which, according to the mold of the sandal, is laterally provided with flutings 4 in which the ends of the straps 12, forming the upper, have to be inserted, before the molding in print 2 of the base. For this reason, in the flutings, and actually at their bases, small stakes 5 are located, clamped by screws, which are inserted in the holes 12c of the straps 12 of the upper itself.

Moreover, base 1 is laterally taped to form two spaces 7 and 8, which facilitate strap-positioning and, superficially, is shaped in order to allow a downflow of mix excess (see 9a, 9b, 9c, 9d, FIG. 1).

The matching of the cover 11 to the base is made by two conic stakes 11c of the cover which are inserted into two conic cavities 10 on the base. The small stakes 5 then, when cover 11 is matched on base 1, go in the coaxial holes 11b of the cover itself.

The straps 12a and 12b, made of leather, plastic or other material, which form the two parts of the upper, are linked to the sole 15 only at their ends; they have infact rectangular holes 13 which, after the solidification of the mix forming the sole, allow a linkage between each strap and the sole itself through the filler of each hole 13 that form a whole with the remaining parts of the sole.

The main manufacturing phases which allow the carrying out of this process are the following:

(a) positioning of the straps 12a and 12b on the inferior part of the mold by inserting the stakes 5 in the hole 12c of the straps which have to be arranged so that the part which is to form the external of the upper faces upward;

(b) filling of the lower part of the mold with mix;

(c) clamping mold cover 11 on base 1;

(d) solidification and contemporary expansion, cooling and taking out of the finished footwear.

To get the upper, the two straps 12a and 12b are linked together by a buckle 14; small nails 16 are inserted both for ornamental purposes and for a better adhesion to the edges of the soles.

The so-obtained linkage of the straps shows a high tearing-resistance; in fact, it cannot fail for degluing or for other similar causes.

The material used for the manufacturing of the sole can be, for instance, for sandals, polyurethan, and for the clogs, PVC, which is heavier and consequently can better imitate wood.

What is claimed:

1. A manufacturing process for footwear containing plastic soles comprising:

providing at least two straps each having means for attachment on one end and some first holes of wide rectangular, circular or other suitable section inboard of and adjacent to the opposite end;

providing a first sole mold portion having flutings on the side edges forming oppositely disposed side openings and a plurality of vertical stakes projecting upwardly from the flutings of said first sole mole portion;

inserting ends of said straps in said oppositely disposed side flutings of the first sole mold portion, inserting the vertical stakes in some second holes of the straps smaller then the first holes in connection with the vertical stakes;

attaching a second sole mold portion adjacent the first mold portion without openings for the end portions of the straps therebetween, wherein said molds have receiving means for the vertical stakes; and pouring a fluid plastic mix suitable to expand itself into said sole mold portions to fill the whole inner volume of the mould itself.

2. Process as claimed in claim 1, wherein said straps of said footwear have inboard of and adjacent to one end holes to be filled with the same mix of the soles, this mix itself forming a whole with the remaining parts of the sole.

3. The process as claimed in claim 1, wherein the mix may be polymer such as polyurethane or polyvinyl chloride.

4. Process as claimed in claim 1, wherein in the lower part 1 of the mold there is the upside-down print 2 of the surface of the sole on which the foot has to lay and, in the upper part 11 of the mold itself there is the upside-down sole surface print which will touch the soil.

* * * * *